(12) United States Patent  
Swallow et al.

(10) Patent No.: US 11,753,819 B2  
(45) Date of Patent: Sep. 12, 2023

(54) ADJUSTABLE STIFFNESS ASSEMBLY

(71) Applicant: John Swallow Associates Limited, Mississauga (CA)

(72) Inventors: John Craven Swallow, Toronto (CA); Allan Leo Raun, Hamilton (CA)

(73) Assignee: John Craven Swallow, Toronto (CA)

( * ) Notice: Subject to any disclaimer, the term of this patent is extended or adjusted under 35 U.S.C. 154(b) by 61 days.

(21) Appl. No.: 16/558,456

(22) Filed: Sep. 3, 2019

(65) Prior Publication Data

US 2020/0003269 A1 Jan. 2, 2020

Related U.S. Application Data

(63) Continuation of application No. 15/638,882, filed on Jun. 30, 2017, now abandoned.

(30) Foreign Application Priority Data

Jun. 30, 2016 (CA) .................................. CA 2934739

(51) Int. Cl.  
*F16F 15/02* (2006.01)  
*E04B 1/98* (2006.01)  
(Continued)

(52) U.S. Cl.  
CPC ............ *E04B 1/98* (2013.01); *E04H 9/0215* (2020.05); *F16F 7/026* (2013.01); *F16F 7/06* (2013.01);  
(Continued)

(58) Field of Classification Search  
CPC .... F16F 1/22; F16F 1/025; F16F 1/027; F16F 15/04; F16F 15/046; F16F 15/06; (Continued)

(56) References Cited

U.S. PATENT DOCUMENTS

| 989,958 A | 4/1911 | Frahm |
| 1,596,321 A | 5/1925 | Spayd |

(Continued)

FOREIGN PATENT DOCUMENTS

| CN | 109723747 A | * | 5/2019 | |
| GB | 617076 | | 2/1949 | |
| WO | WO-2004074707 A1 | * | 9/2004 | ............ F16F 1/027 |

*Primary Examiner* — Nicholas J Lane  
*Assistant Examiner* — Stephen M Bowes  
(74) *Attorney, Agent, or Firm* — Kagan Binder, PLLC

(57) ABSTRACT

The invention provides an adjustable stiffness assembly for use in conjunction with a fixed stiffness element to elastically connect a structure to a mass. The assembly includes a structure mount, a mass mount, and a rotatable stiffness element. The rotatable stiffness element rotatably engages with the structure mount and the mass mount, and has a minimum stiffness value with respect to forces in a direction a maximum stiffness value with respect to forces in another direction The fixed stiffness element and the adjustable stiffness assembly together provide a complete stiffness assembly having a total stiffness value with respect to force in the global direction for elastically connecting the mass and the structure. The first rotatable stiffness element is rotatable relative to the structure mount and the first mass mount to vary the total stiffness value of the complete stiffness assembly with respect to force in the global direction.

19 Claims, 4 Drawing Sheets

(51) Int. Cl.
*F16F 7/116* (2006.01)
*F16F 7/10* (2006.01)
*E04H 9/02* (2006.01)
*F16F 7/02* (2006.01)
*F16F 7/06* (2006.01)
*F16F 13/00* (2006.01)
*E04B 1/19* (2006.01)
*F16F 15/04* (2006.01)

(52) U.S. Cl.
CPC ............ *F16F 7/1028* (2013.01); *F16F 7/116* (2013.01); *E04B 1/19* (2013.01); *F16F 13/007* (2013.01); *F16F 15/04* (2013.01); *F16F 2222/12* (2013.01); *F16F 2224/0208* (2013.01); *F16F 2228/066* (2013.01); *F16F 2238/026* (2013.01); *F16F 2238/04* (2013.01)

(58) Field of Classification Search
CPC ........ F16F 7/1022; F16F 7/1028; F16F 7/104; F16F 7/116; F16F 2228/06; F16F 2236/027; F16F 2224/0208; F16F 2228/066; F16F 2238/026

USPC .......................................... 56/340.1; 224/268
See application file for complete search history.

(56) References Cited

U.S. PATENT DOCUMENTS

| | | |
|---|---|---|
| 1,540,734 A | 6/1925 | Houdry |
| 2,744,748 A * | 5/1956 | Wiegers .............. F16K 17/0493 267/158 |
| 4,873,820 A * | 10/1989 | Martorell ............... A01D 46/26 56/340.1 |
| 6,681,908 B2 | 1/2004 | Davis |
| 8,044,629 B2 | 10/2011 | Fallahi |
| 8,322,695 B2 | 12/2012 | Sugar et al. |
| 2003/0030204 A1 | 2/2003 | Chou |
| 2006/0108764 A1* | 5/2006 | Bidlingmaier ............ F16F 3/10 280/124.164 |
| 2008/0308368 A1 | 12/2008 | Gustavsson |
| 2011/0017561 A1 | 1/2011 | Tanaka |
| 2011/0079478 A1 | 4/2011 | Gustavsson |
| 2014/0048989 A1 | 2/2014 | Platus |

* cited by examiner

ADJUSTABLE STIFFNESS ASSEMBLY

PRIORITY CLAIM

This application is a continuation application of U.S. Ser. No. 15/638,882, filed Jun. 30, 2017, the entirety of which is incorporated herein by reference, and claims priority to Canadian application having Serial Number 2,934,739, filed on Jun. 30, 2016.

FIELD OF THE INVENTION

The present invention relates generally to mechanisms for elastically connecting a mass to another mass, and more particularly to mechanisms for elastically connecting a mass to a vibrating mass where the mechanism is adjustable to vary the stiffness of the connection.

BACKGROUND OF THE INVENTION

A Tuned Mass Damper (TMD) is an assembly that includes a mass block connected by a stiffness element (spring) and a damping element to a structure where the structure vibrates when driven by an impressed force. The purpose of the TMD is to reduce the vibration of the structure by transferring the vibrational energy to the TMD, and dissipating it through a damping (energy dissipating) element. The TMD's vibration characteristics are tuned according to the structure's characteristics, so that the structure's motion causes amplified motion in the TMD. A damping element located between the TMD and structure responds to the relative motion between the TMD and the structure, resulting in vibrational energy dissipation, reducing the motion of the structure.

Based on the structure, the mass and natural frequency of the TMD are selected. Based on these values, a required stiffness value is determined. Steel coil springs are generally used to provide the stiffness, however due to manufacturing tolerances and variation between spring units, the resulting stiffness often differs from the theoretical stiffness, and as a result, the natural frequency requirement is not achieved.

The natural frequency may be adjusted by changing the mass or the stiffness of the assembly. It is preferred to adjust the stiffness, as changing the mass will affect the TMD's effectiveness. Because coil springs are non-adjustable, adjustment of the stiffness is generally achieved by replacing coil springs with other coil springs, which have different dimensions, requiring changes to the spring mount geometry, resulting in delays and additional costs. Because the new coil springs are also likely to vary from their theoretical values, an iterative process results in further delays and additional costs.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides an adjustable stiffness assembly for use in conjunction with a fixed stiffness element to elastically connect a structure to a mass. The fixed stiffness element provides stiffness with respect to force in a global direction. The adjustable stiffness assembly includes a structure mount that can be attached to the structure, a first mass mount that can be attached to the mass, and a first rotatable stiffness element. The structure mount is spaced apart from the first mass mount. The first rotatable stiffness element extends between the structure mount and the first mass mount and is rotatably engaged with the structure mount and the first mass mount. The first rotatable stiffness element has a minimum stiffness value with respect to forces in a local direction referred to as X, and a maximum stiffness value with respect to forces in another local direction referred to as Y. The maximum stiffness value is greater than the minimum stiffness value. The fixed stiffness element and the adjustable stiffness assembly together provide a complete stiffness assembly having a total stiffness value with respect to force in the global direction for elastically connecting the mass and the structure. The first rotatable stiffness element is rotatable relative to the structure mount and the first mass mount to vary the total stiffness value of the complete stiffness assembly with respect to force in the global direction.

The first rotatable stiffness element may be a beam having a longitudinal axis extending in a direction orthogonal to the X and Y directions between the structure mount and the mass mount, the beam having a non-circular cross-section orthogonal to the longitudinal axis. The beam may have a rectangular cross-section orthogonal to the longitudinal axis, and the thickness of the beam in the X direction along a minimal stiffness axis of the beam may be less than the width of the beam in the Y direction along a maximal stiffness axis of the beam.

The fixed stiffness element may be one or more springs, each spring having constant stiffness.

The adjustable stiffness assembly may include a second rotatable stiffness element that is substantially the same as the first rotatable stiffness element and is rotatably engaged with the structure mount and the first mass mount. The second rotatable stiffness element may have a minimum stiffness value with respect to forces in a local direction referred to as V, and a maximum stiffness value with respect to forces in another local direction referred to as W, wherein the maximum stiffness value is greater than minimum stiffness value. The first and second rotatable stiffness elements may both be configurable by rotating them in opposite directions so that each rotatable stiffness element has substantially the same stiffness value with respect to forces in the global direction so that lateral forces on the stiffness elements are balanced when force is applied to the stiffness elements in the global direction. The second rotatable stiffness element may be a beam with a longitudinal axis extending in a direction orthogonal to the V and W directions between the structure mount and the first mass mount. The beam may have a non-circular cross-section orthogonal to the longitudinal axis.

The invention also provides a tuned mass damper including a mass block assembly and a damper stiffness assembly. The damper stiffness assembly includes a fixed stiffness element attached to the mass block assembly, and an adjustable stiffness assembly having a stiffness value with respect to force in the global direction. The fixed stiffness element provides stiffness with respect to force in a global direction. The adjustable stiffness has a stiffness value with respect to force in the global direction. The adjustable stiffness assembly includes a structure mount that can be attached to a structure, a first mass block assembly mount attached to the mass block assembly, and a first rotatable stiffness element. The structure mount is spaced apart from the first mass block assembly mount. The first rotatable stiffness element extends between the structure mount and the first mass block assembly mount and is rotatably engaged with the structure mount and the mass block assembly mount. The first rotatable stiffness element has a minimum stiffness value with respect to forces in a local direction referred to as X, and a maximum stiffness value with respect to forces in another local direction referred to as Y. The maximum stiffness value is greater than minimum stiffness value. The damper stiffness assembly elastically connects the mass block assembly and the structure. The first rotatable stiffness element is rotatable relative to the structure mount and the first mass block assembly mount to vary the total stiffness value of the damper stiffness assembly with respect to force in the global direction. The first rotatable stiffness element may be a beam having a longitudinal axis extending in a direction orthogonal to the X and Y directions between the structure mount and the first mass block assembly mount, and the beam may have a non-circular cross-section orthogonal to the longitudinal axis. The beam may have a rectangular cross-section orthogonal to the longitudinal axis, and the thickness of the beam in the X direction along a minimal stiffness axis of the beam may be less than the width of the beam in the Y direction along a maximal stiffness axis of the beam. The adjustable stiffness assembly may also include a second rotatable stiffness element that is substantially the same as the first rotatable stiffness element. In such embodiments, the second rotatable stiffness element is rotatably engaged with the structure mount and the mass block assembly mount and positioned so that the longitudinal axes of the rotatable stiffness elements are parallel to each other. The second rotatable stiffness element may have the minimum stiffness value with respect to forces in a local direction referred to as V, and the maximum stiffness value with respect to forces in another local direction referred to as W. The first and second rotatable stiffness elements are configurable by rotating them in opposite directions so that each rotatable stiffness element has substantially the same stiffness value with respect to forces in the global direction so that lateral forces on the stiffness elements are balanced. The mass block assembly may consist of a frame that is attachable to the first mass block assembly mount and a mass block supported by the frame. The mass block assembly may include multiple steel mass blocks supported by the frame. The fixed stiffness element may include one or more springs, each spring having constant stiffness. The adjustable stiffness assembly may also include a second mass block assembly mount attached to the mass block assembly. In such embodiments, the first and second mass block assembly mounts are rotatably engaged with the first rotatable stiffness element at opposite ends of the first rotatable stiffness element, and the structure mount being rotatably engaged with a central portion of the first rotatable stiffness element. The tuned mass damper may include a second mass block assembly mount attached to the mass block assembly, where the beam has first and second ends and a middle section, and where the first mass block assembly mount is rotatably engaged with the beam near the first end of the beam. The second mass block assembly mount may be rotatably engaged with the beam near the second end of the beam, and the structure mount may be rotatably engaged with the middle section of the beam.

The invention also provides an adjustable stiffness assembly for elastically connecting a structure to a mass. The adjustable stiffness assembly has a global stiffness value with respect to force in a global direction. The adjustable stiffness assembly includes a structure mount that can be attached to the structure, a mass mount that can be attached to the mass, and a first rotatable stiffness element. The structure mount is spaced apart from the mass mount being spaced apart. The first rotatable stiffness element extends between the structure mount and the mass mount and is rotatably engaged with the structure mount and the mass mount. The first rotatable stiffness element has a minimum stiffness value with respect to forces in a local direction referred to as X, and a maximum stiffness value with respect to forces in another local direction referred to as Y. The maximum stiffness value is greater than minimum stiffness value. The first rotatable stiffness element is rotatable relative to the structure mount and the mass mount to vary the global stiffness value of the adjustable stiffness assembly. The first rotatable stiffness element may be a beam having a longitudinal axis extending in a direction orthogonal to the X and Y directions between the structure mount and the mass mount, and the beam may have a non-circular cross-section orthogonal to the longitudinal axis. The adjustable stiffness assembly may include a second rotatable stiffness element that is substantially the same as the first rotatable stiffness element and is rotatably engaged with the structure mount and the mass mount. In such embodiments, the second rotatable stiffness element has a minimum stiffness value with respect to forces in one direction, and a maximum stiffness value with respect to forces in another direction, where the maximum stiffness value is greater than the minimum stiffness value

DETAILED DESCRIPTION OF THE INVENTION

The present invention provides an adjustable stiffness assembly, optionally for use in conjunction with one or more fixed stiffness elements, to elastically connect a structure to a mass. A structure may be, for example, a high-rise building. The mass may be an assembly of metal mass blocks attached to a frame, for example. Such a mass when placed near the top of a tall building and elastically connected to the building can act as a tuned mass damper to reduce the amplitude of mechanical vibrations, which can be useful in preventing or reducing discomfort, damage or structural failure that might otherwise be cause by harmonic motion of the building. The ability to adjust the stiffness of the adjustable stiffness assembly allows systems employing the adjustable stiffness assembly to be tuned, for example, to either move the main mode away from a troubling excitation frequency, or to add damping to a resonance that is difficult or expensive to damp directly.

Figure 1A:
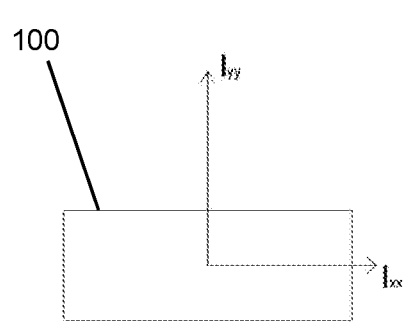
FIGS. 1a, 1b and 1c are three end views of a rotatable stiffness element in the form of a beam with a rectangular cross-section in three different rotational positions.
Figure 1B:
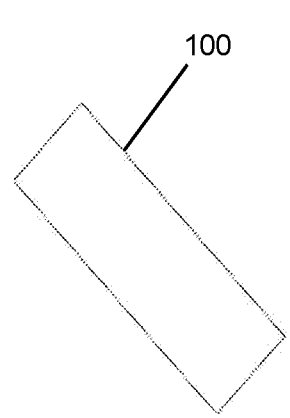
Figure 1C:
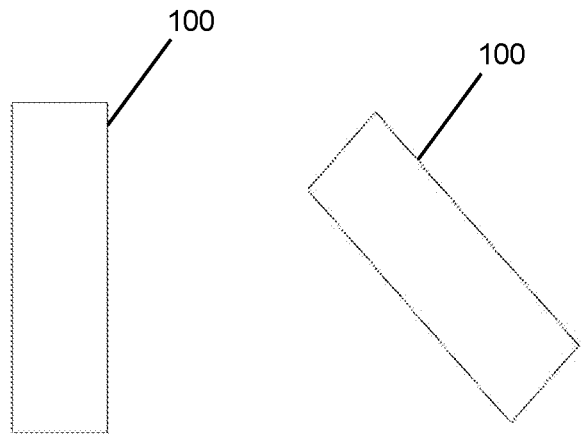

A key element of the adjustable stiffness assembly is a rotatable stiffness element. A preferred embodiment of the rotatable stiffness element is a beam 100 with a rectangular cross section as shown in the adjustable stiffness assembly 200 of FIG. 2, and shown in an end view in three rotational positions in FIGS. 1a, 1b and 1c. The beam 100 is extended along a longitudinal axis in a local direction that may be referred to as the "Z" direction. Such a beam 100 is typically made of metal, such as steel, which can bend under forces not aligned with the longitudinal axis. The resistance to bending under a force represents the stiffness of the beam 100, and the stiffness varies according to the direction of the force. While it is preferred that the beam have a cross-section perpendicular to the longitudinal axis that is rectangular at most points in the beam, and not square, it is not essential that it be rectangular, in whole or in part. Rather it is only necessary that the beam have a non-circular cross-section orthogonal to the longitudinal axis. This results in the rotatable stiffness element having a minimum stiffness value with respect to forces in a local direction referred to as X, and a larger maximum stiffness value with respect to forces in another local direction referred to as Y, where the X and Y axes are both orthogonal to Z. In the case of a rectangular beam 100, the X axis extends through the beam 100 orthogonal to the two wide surfaces of the beam 100 (i.e. the extent of the X axis through the beam 100 is the thickness of the beam 100), and the Y axis extends through the beam 100 orthogonal to the two narrow surfaces of the beam 100 (i.e. the extent of the Y axis through the beam 100 is the width of the beam 100). More generally, it is simply required that the second moment of area around the X axis ($I_{xx}$) differs from its second moment of area around the Y axis ($I_{yy}$).

The term "local direction" in the context of an element such as a beam is intended to mean that the direction is relative to the beam.

When the beam 100 is aligned so that the Z axis is orthogonal to a particular principal or global direction, which may be vertical/downward corresponding to the direction of gravitational force, the beam 100 presents a stiffness value to forces in the global direction that depends on the rotational position of the beam 100. The stiffness value in the global direction is minimal when the X axis is oriented in the global direction, as in FIG. 1a, taking the global direction to be downward. The stiffness value in the global direction is maximal when the Y axis is oriented in the global direction, as in FIG. 1b. As the beam 100 is rotated from the position shown in FIG. 1a towards the position shown in FIG. 1b, the stiffness value in the global direction continuously increases until reaching the maximum value in the position shown in FIG. 1b. When the beam is in an intermediate rotational position, such as that shown in FIG. 1c, then the stiffness value in the global direction is intermediate between the minimum and maximum values. By selecting a suitable rotational position, the stiffness value in the global direction may be selected to be any value between the minimum and maximum values.

In addition to the beam 100, the adjustable stiffness assembly 200 includes a mass mount 201 and a structure mount 202. The beam 100 extends between the mass mount 201 and structure mount 202 and the beam 100 is rotatably connected to each mount so that the beam 100 may be rotated and secured in any rotational position. When the mass mount 201 is rigidly connected to a mass and the structure mount 202 is rigidly connected to a structure, the adjustable stiffness assembly 200 elastically connects the mass and structure and provides a stiffness value in the global direction. The beam 100 can be rotated to vary the stiffness value in the global direction.

Figure 2:
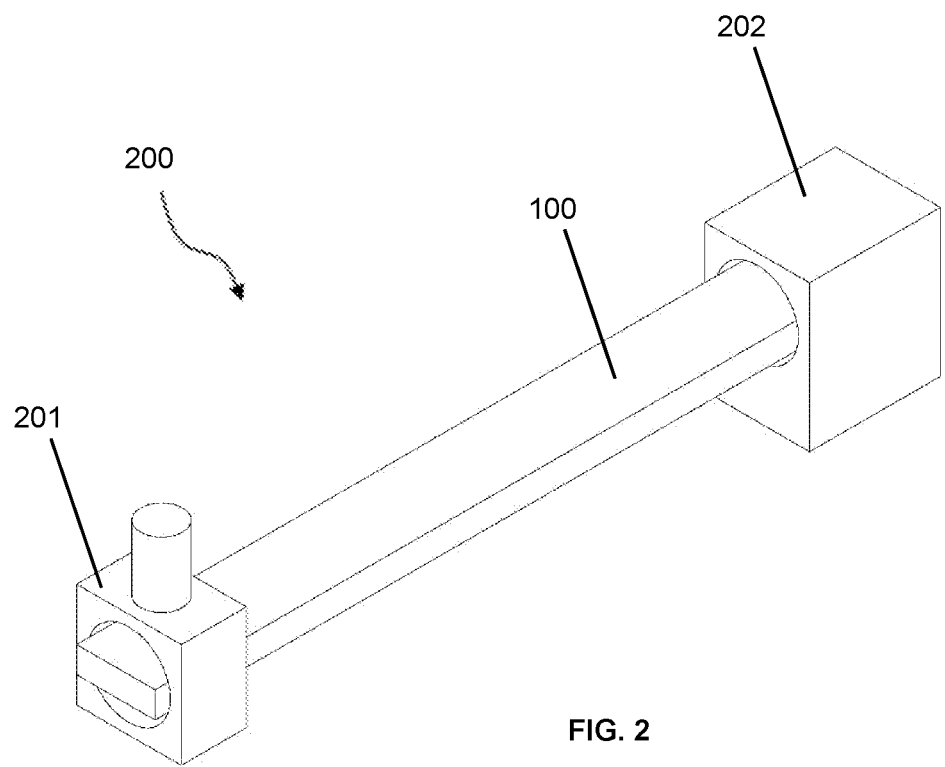
FIG. 2 is a perspective view of an adjustable stiffness assembly.
Figure 3:
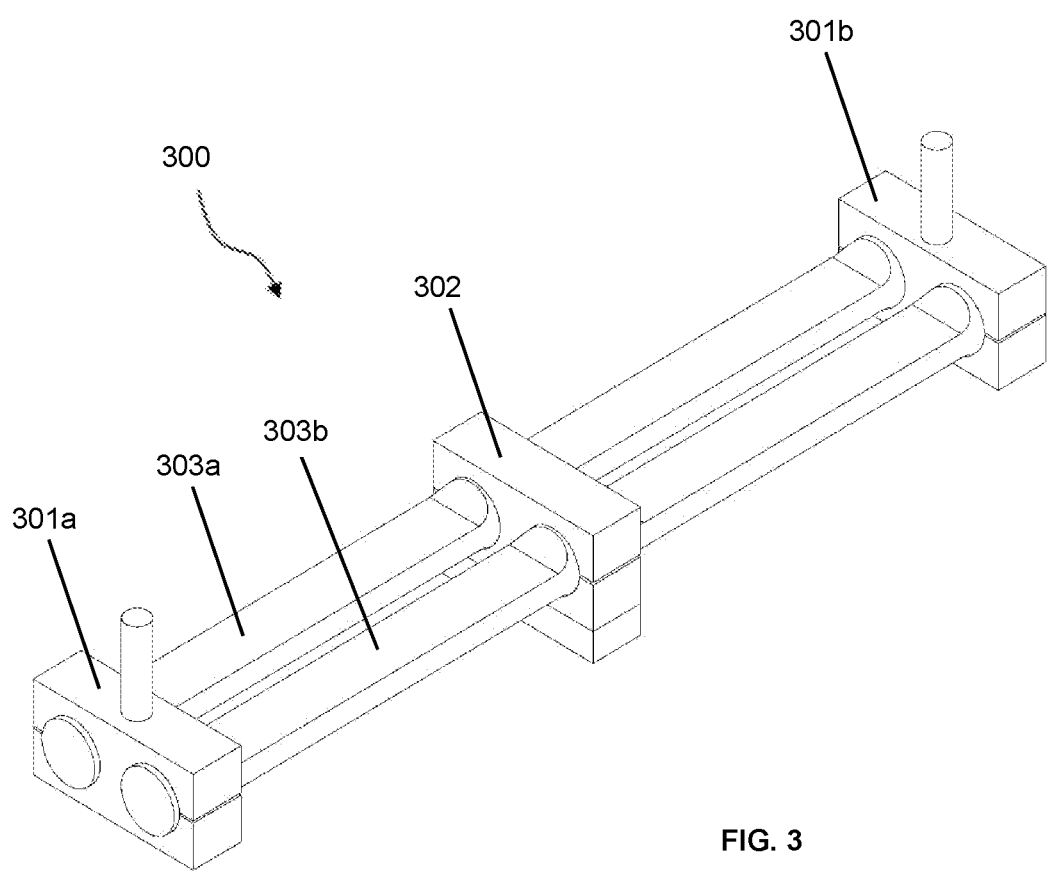
FIG. 3 is a perspective view of another embodiment of an adjustable stiffness assembly.

The embodiment shown in FIG. 2 employs only one rotatable stiffness element (the beam 100) and one mass mount 201. FIG. 3 shows an embodiment of an adjustable stiffness assembly 300 with two beams 303a, 303b used as rotatable stiffness elements and two mass mounts 301a, 301b, with a structure mount 302 intermediate between the two mass mounts 301a, 301b. Each beam 303a, 303b is rotatably connected to each of the two mass mounts 301a, 301b and the structure mount 302. As shown in FIG. 3, while the beams 303a, 303b have a rectangular cross section at most points along their length, each beam 303a, 303b has three portions with a circular cross section orthogonal to the longitudinal axis designed to mate with cylindrical openings in the mass mounts 301a, 301b and the structure mount 302 while still allowing rotation of the beams 303a, 303b relative to the mounts.

It is preferred that, when tuning the adjustable stiffness assembly 300, that the two beams 303a, 303b are rotated in opposite directions. With such embodiments, the system provides a variable stiffness in the vertical direction without any other effects/consequences/influence on the TMD system. For example, starting from the position shown in FIG. 3 where each beam 303a, 303b is in an orientation providing the minimum stiffness value in the global direction (which is taken to be downward in FIG. 3), the first beam 303a may be rotated clockwise around the longitudinal axis by N degrees (N being a number between 0 and 90) and the second beam 303b may be rotated counter-clockwise by N degrees. Such an approach is preferable because lateral forces on the beams 303a, 303b are then balanced when force is applied to the beams 303a, 303b in the global direction. When only one rotated beam is employed, the shear centre of the rotated beam is no longer coincident with the beam centroid and lateral forces are generated, but this is not the case when two beams rotated in opposite directions are employed because the lateral forces balance one another.

The two beams 303a, 303b shown in FIG. 3 may extend through the structure mount 302 so that there are only two separate rotatable stiffness elements. Alternatively, there may be four or more pairs of separate rotatable stiffness elements such that the portions on either side of the structure mount 302 are independently rotatable. This is generally preferred in order to provide to provide a balance of the stiffnesses of the adjustable stiffness assemblies with respect to the centre of gravity of the mass block.

Figure 4:
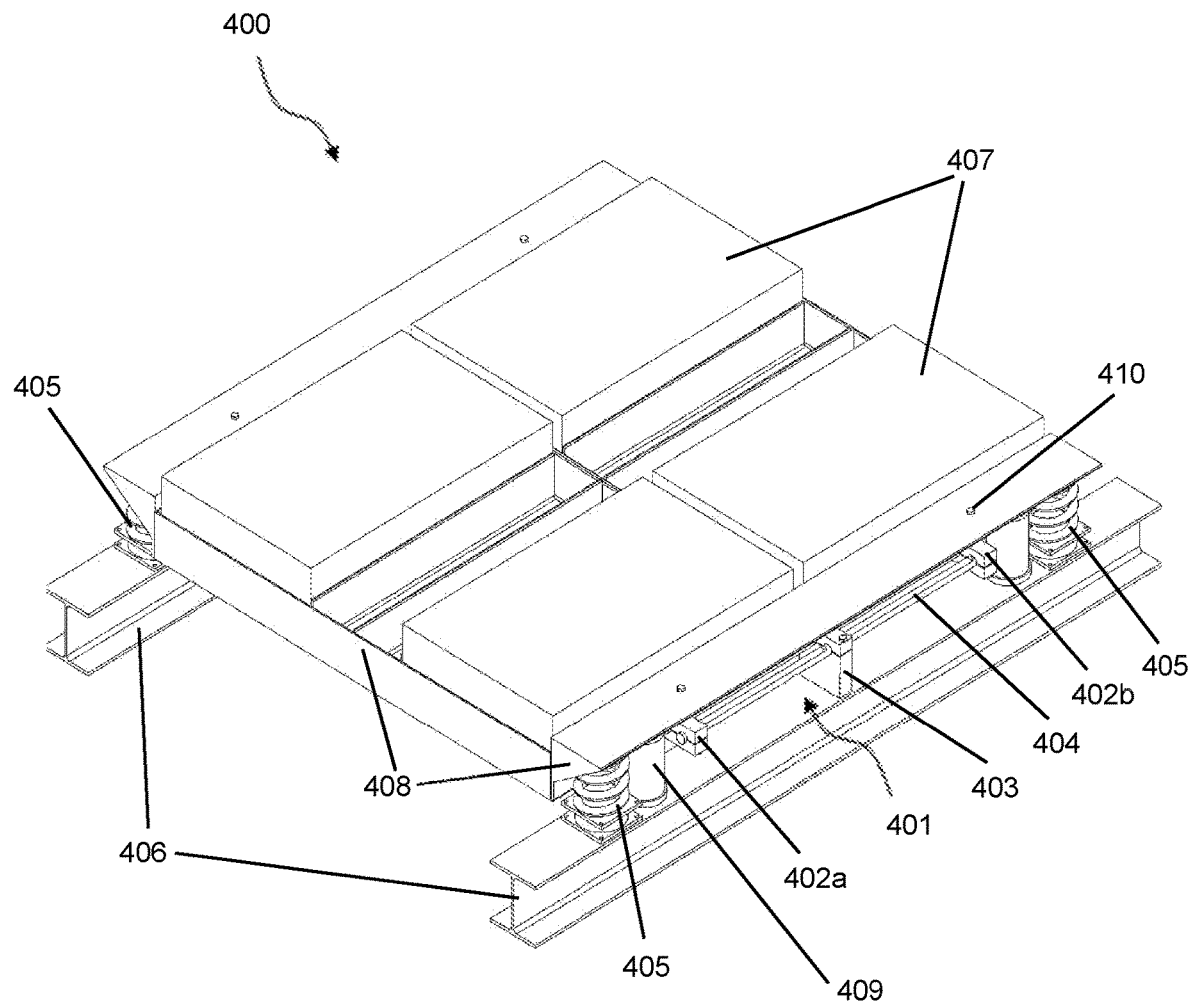
FIG. 4 is a perspective view of a tuned mass damper assembly utilizing an adjustable stiffness assembly.

In preferred embodiments, the adjustable stiffness assembly further includes one or more fixed stiffness elements, such as steel coil springs 405 as shown in FIG. 4. In this way the adjustable stiffness assembly can provide an arbitrarily large total stiffness value in the global direction (being the sum of the stiffnesses of all the fixed stiffness elements and the rotatable stiffness elements in the global direction) such that the total stiffness value can be varied by rotating the rotatable stiffness elements. The maximum variation is then the difference between the sum of the maximum stiffness values of the rotatable stiffness elements and the sum of the minimum stiffness values of the rotatable stiffness elements.

Figure 5:
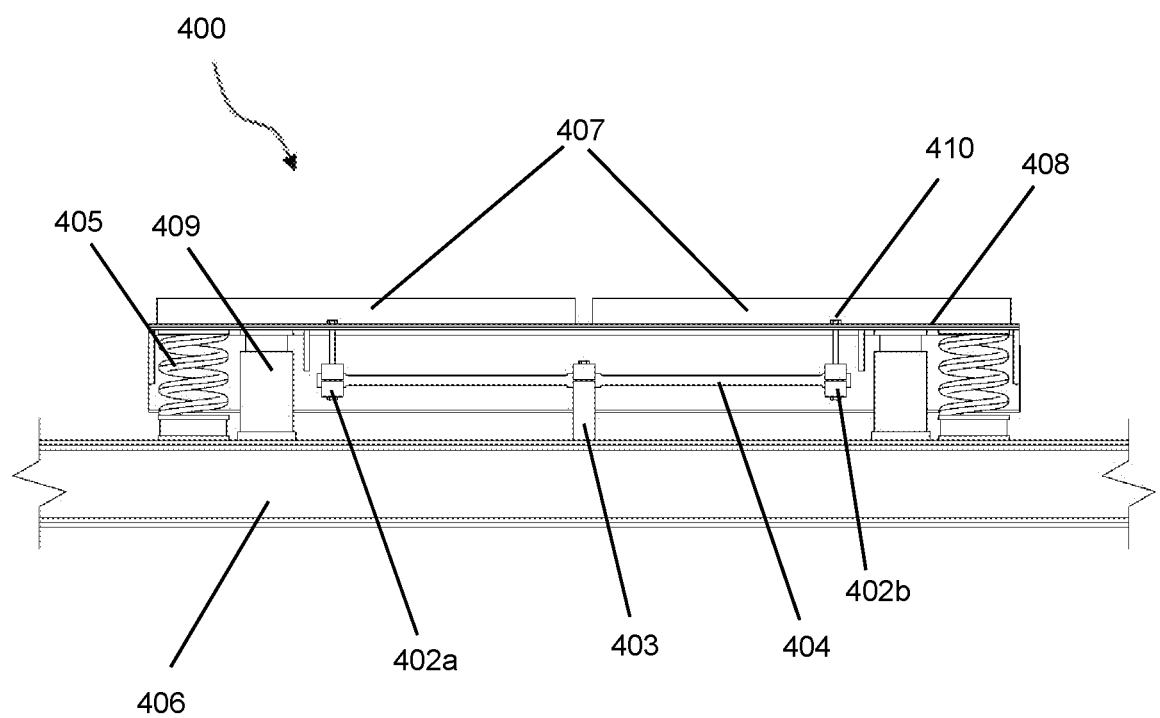
FIG. 5 is a side view of the tuned mass damper assembly of FIG. 4 showing the adjustable stiffness assembly.

FIG. 4 depicts a TMD 400 incorporating two adjustable stiffness assemblies 401 according to the present invention. In FIG. 4, a damper stiffness assembly elastically connects a mass block assembly having mass blocks 407 supported by a frame 408 to a structure 406. The depicted structure 406 in FIG. 4 is two I-beams which may be rigidly attached to a large structure, such as a building. The frame 408 is rigidly connected to two adjustable stiffness assemblies 401, one on each side (only one spring 405 of the rear adjustable stiffness assembly is visible in FIG. 4). Each adjustable stiffness assembly 401 includes rotatable stiffness elements 404 rotatably connected to a structure mount 403 and two mass mounts 402a, 402b, and two fixed stiffness elements in the form of steel coil springs 405. The mass mounts 402a, 402b are rigidly connected to the frame 408 of the mass block assembly, and the structure mount 403 is rigidly connected to a beam 406 that is part of the structure. The mass mounts 402a, 402b are rigidly connected to the frame 408 of the mass block assembly via holes 410 through the frame 408 as depicted in FIG. 4. The depicted adjustable TMD 400 also includes two damping elements 409 used in conjunction with each adjustable stiffness assembly 401 to dissipate vibrational energy. Each damping element 409, which are typically hydraulic damping elements, connects to both the structure 406 and the frame 408 of the mass block assembly, as can be seen in FIG. 5. The adjustable stiffness assemblies 401 provide an elastic connection between the frame 408 of the mass block assembly and the beams 406 of the structure. Relative motion of the mass block assembly and the structure 206 results in force being applied to the beams 404 causing a bending stress. Generally, such force is in the global direction which can be taken to be downward in the figures. The total stiffness of the adjustable stiffness assemblies 401 can be adjusted, as discussed above, by rotating one or more of the rotatable stiffness elements 404.

A TMD employing the adjustable stiffness assembly may include a mechanism to minimize the lateral forces that result when the force is not perpendicular to one of the beam's principal stiffness axes. This may be achieved by limiting the direction of the relative motion between the two structures, or by utilizing a symmetric group of springs to provide equal and opposite lateral forces such that no net lateral force is applied to the structure.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A tuned mass damper for attachment to a structure comprising:
   a mass block assembly comprising at least one mass block; and
   a damper stiffness assembly comprising:
      a fixed stiffness element attached to the mass block assembly, the fixed stiffness element providing stiffness with respect to force in a direction relative to the structure, referred to as the structure direction; and
      an adjustable stiffness assembly having a stiffness value with respect to force in the structure direction, the adjustable stiffness assembly comprising:
         a structure mount attachable to the structure;
         a first mass block assembly mount attached to the mass block assembly, the structure mount being spaced apart from the first mass block assembly mount; and
         a beam having a thickness, a width, and a length that is greater than the thickness and the width, extending lengthwise between the structure mount and the first mass block assembly mount and being rotatably engaged with the structure mount and the mass block assembly mount, the beam having a longitudinal axis extending along the length of the beam, the beam being shaped so that a second moment of area ($I_{xx}$) of the beam around a first direction, referred to as X, orthogonal to the longitudinal axis is greater than a second moment of area ($I_{yy}$) of the beam around a second direction, referred to as Y, orthogonal to the longitudinal axis and orthogonal to the first direction,
         so that the beam has a minimum stiffness value with respect to moments about the second direction, which is less than a maximum stiffness value with respect to moments about the first direction,
   wherein the damper stiffness assembly elastically connects the mass block assembly and the structure;
   and wherein the beam is securable in a fixed rotational position relative to the structure mount and the first mass mount to provide a fixed stiffness value with respect to force in the structure direction,
   and wherein the beam is rotatable relative to the structure mount and the first mass block assembly mount about the longitudinal axis to vary the total stiffness value of the damper stiffness assembly with respect to force in the structure direction.

2. The tuned mass damper of claim 1, wherein the beam has a rectangular cross-section orthogonal to the longitudinal axis, and the thickness of the beam in the X direction along a minimal stiffness axis of the beam is less than the width of the beam in the Y direction along a maximal stiffness axis of the beam.

3. The tuned mass damper of claim 1, wherein the mass block assembly comprises a frame that is attachable to the first mass block assembly mount and the mass block supported by the frame.

4. The tuned mass damper of claim 3, wherein the mass block assembly comprises a plurality of steel mass blocks supported by the frame.

5. The tuned mass damper of claim 1, wherein the fixed stiffness element comprises one or more springs, each spring having constant stiffness.

6. The tuned mass damper of claim 1, wherein the beam has a non-circular cross-section orthogonal to the longitudinal axis.

7. The tuned mass damper of claim 1, wherein the structure is a building.

8. The tuned mass damper of claim 1, wherein the structure is connected to the mass block by a fixed stiffness element.

9. The tuned mass damper of claim 8, wherein the fixed stiffness element is a spring.

10. An adjustable stiffness assembly for elastically connecting a structure to a mass comprising at least one mass block, the adjustable stiffness assembly having a structural stiffness value with respect to force in a direction relative to the structure, referred to as the structure direction, the adjustable stiffness assembly comprising:
   a structure mount attachable to the structure;
   a mass mount attachable to the mass, the structure mount being spaced apart from the mass mount; and
   a beam having a thickness, a width, and a length that is greater than the thickness and the width, extending lengthwise between the structure mount and the mass mount and being rotatably engaged with the structure mount and the mass mount, the beam having a longitudinal axis extending along the length of the beam, the beam being shaped so that a second moment of area ($I_{xx}$) of the beam around a first direction, referred to as X, orthogonal to the longitudinal axis is greater than a second moment of area ($I_{yy}$) of the beam around a second direction, referred to as Y, orthogonal to the longitudinal axis and orthogonal to the first direction,
   so that the beam has a minimum stiffness value with respect to moments about the second direction, which is less than a maximum stiffness value with respect to moments about the first direction;
   wherein the beam is securable in a fixed rotational position relative to the structure mount and the first mass mount to provide a fixed stiffness value with respect to force in the structure direction,
   and wherein the beam is rotatable relative to the structure mount and the mass mount about the longitudinal axis to vary the structural stiffness value of the adjustable stiffness assembly.

11. The adjustable stiffness assembly of claim 10, wherein the beam has a rectangular cross-section orthogonal to the longitudinal axis, and the thickness of the beam in the X direction along a minimal stiffness axis of the beam is less than the width of the beam in the Y direction along a maximal stiffness axis of the beam.

12. The adjustable stiffness assembly of claim 10, wherein the beam has a non-circular cross-section orthogonal to the longitudinal axis.

13. The tuned mass damper of claim 10, wherein the structure is a building.

14. The tuned mass damper of claim 10, wherein the structure is connected to the mass block by a fixed stiffness element.

15. The tuned mass damper of claim 14, wherein the fixed stiffness element is a spring.

16. An adjustable stiffness assembly for elastically connecting a structure to a mass comprising at least one mass block, the adjustable stiffness assembly having a structural stiffness value with respect to force in a first direction relative to the structure, the adjustable stiffness assembly comprising:
   a structure mount attachable to the structure;
   a mass mount attachable to the mass, the structure mount being spaced apart from the mass mount; and
   a rotatable stiffness element having a thickness, a width, and a length that is greater than the thickness and the width, extending lengthwise between the structure mount and the mass mount and being rotatably engaged with the structure mount and the mass mount, the rotatable stiffness clement element having a minimum stiffness value with respect to forces in a first direction relative to the rotatable stiffness element, the first direction referred to as X, and a maximum stiffness value with respect to forces in a second direction relative to the rotatable stiffness element, the second direction referred to as Y, wherein the maximum stiffness value is greater than the minimum stiffness value;
   wherein the rotatable stiffness element is securable in a fixed rotational position relative to the structure mount and the first mass mount to provide a fixed stiffness value with respect to force in the first direction,
   and wherein the rotatable stiffness element is rotatable relative to the structure mount and the mass mount about a longitudinal axis extending in a direction orthogonal to the X and Y directions between the structure mount and the first mass block assembly mount to vary the structural stiffness value of the adjustable stiffness assembly,
   and wherein the rotatable stiffness element is a beam having a non-circular cross-section orthogonal to the longitudinal axis.

17. The tuned mass damper of claim 16, wherein the structure is a building.

18. The tuned mass damper of claim 16, wherein the structure is connected to the mass block by a fixed stiffness element.

19. The tuned mass damper of claim 18, wherein the fixed stiffness element is a spring.

* * * * *